US007113207B2

(12) United States Patent
Fukui et al.

(10) Patent No.: US 7,113,207 B2
(45) Date of Patent: Sep. 26, 2006

(54) CHROMINANCE SIGNAL PROCESSING APPARATUS, IMAGE-SENSING APPARATUS AND CONTROL METHODS FOR SAME

(75) Inventors: Takaaki Fukui, Kanagawa (JP); Eiichiro Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 10/216,999

(22) Filed: Aug. 12, 2002

(65) Prior Publication Data

US 2003/0035069 A1 Feb. 20, 2003

(30) Foreign Application Priority Data

Aug. 14, 2001 (JP) ............... 2001-246216

(51) Int. Cl.
*H04N 9/73* (2006.01)
*H04N 9/68* (2006.01)
(52) U.S. Cl. ............... 348/225.1; 348/222.1; 348/645
(58) Field of Classification Search ............. 348/225.1, 348/222.1, 645, 646, 223.1; 382/167
See application file for complete search history.

(56) References Cited

U.S. PATENT DOCUMENTS

| 5,247,366 A | * | 9/1993 | Ginosar et al. | ............. | 348/256 |
| 5,446,504 A | | 8/1995 | Wada | ............. | 348/645 |
| 5,563,666 A | * | 10/1996 | Suzuki | ............. | 348/645 |
| 6,433,836 B1 | * | 8/2002 | Suzuki et al. | ............. | 348/625 |
| 6,456,325 B1 | * | 9/2002 | Hayashi | ............. | 348/234 |
| 6,618,502 B1 | * | 9/2003 | Okada et al. | ............. | 382/167 |
| 6,961,085 B1 | * | 11/2005 | Sasaki | ............. | 348/222.1 |
| 6,972,793 B1 | * | 12/2005 | Kameyama | ............. | 348/256 |

FOREIGN PATENT DOCUMENTS

| JP | 2000-115795 | 4/2000 |
| WO | WO 94/18801 | 8/1994 |

OTHER PUBLICATIONS

EPO Communication dated Mar. 4, 2005 w/European Search Report dated Feb. 25, 2005.

* cited by examiner

*Primary Examiner*—Lin Ye
(74) *Attorney, Agent, or Firm*—Morgan & Finnegan, LLP

(57) ABSTRACT

The present invention relates to a chrominance signal processing apparatus and method for providing optimal color processing according to the hue of the color image data. Red, green and blue signals are input to a chroma composition ratio determination circuit that generates and outputs the RGB color composition ratio ($\alpha:\beta:\gamma$). A chroma suppression luminance signal generating circuit then generates a chroma suppression luminance signal Ya based on the RGB signals and the color composition ratio. A chroma suppression gain determination circuit outputs the gain for the chroma suppression luminance signal based on a table in which output gain setting values corresponding to the chroma suppression luminance signals are recorded. Multipliers then multiply input color-difference signals Cr, Cb by the gain and output a suppressed color-difference signals (Cr×G, Cb×G) according to the color composition ratio ($\alpha:\beta:\gamma$).

13 Claims, 9 Drawing Sheets

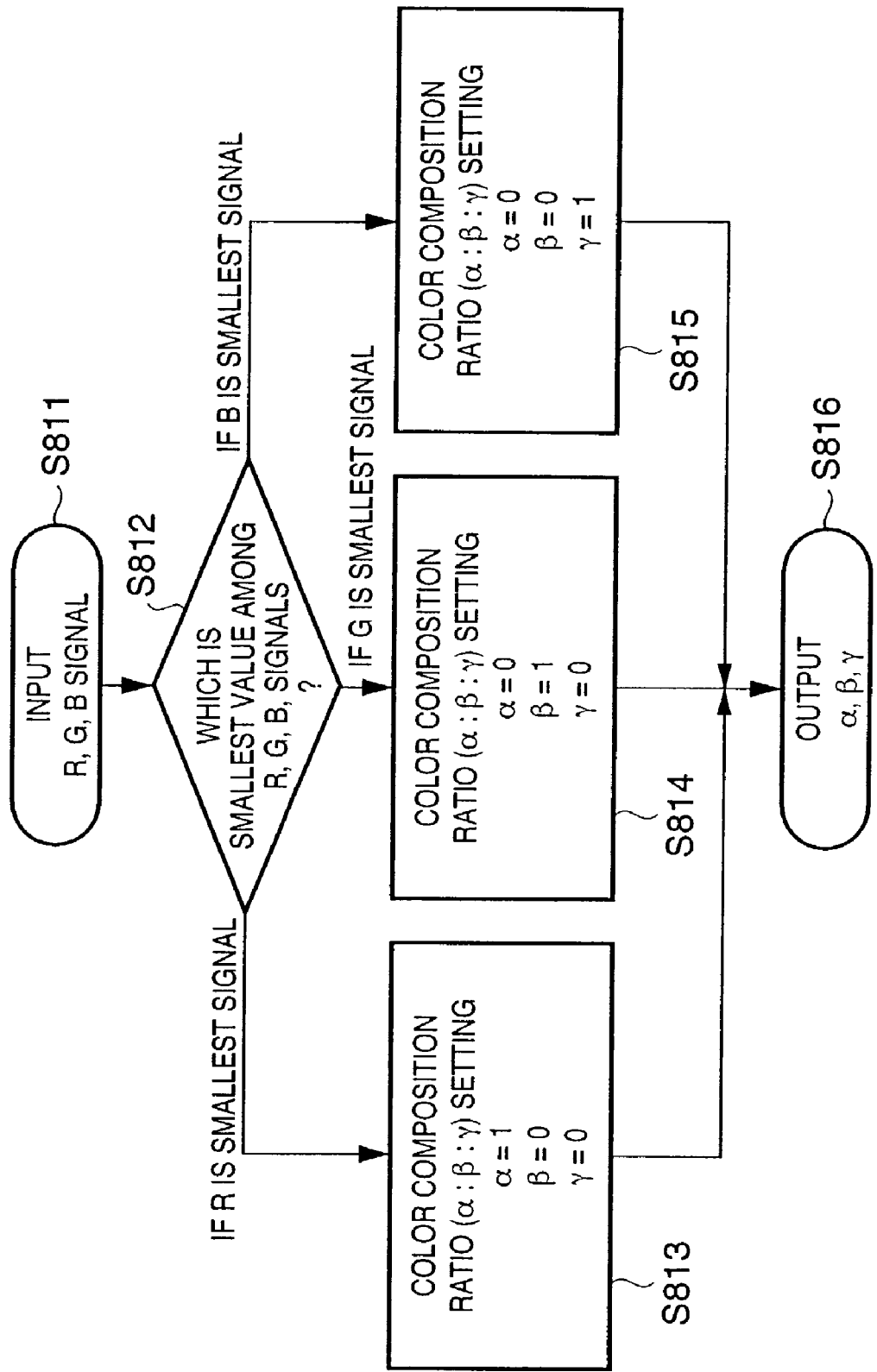

CHROMINANCE SIGNAL PROCESSING APPARATUS, IMAGE-SENSING APPARATUS AND CONTROL METHODS FOR SAME

FIELD OF THE INVENTION

The present invention relates to a chrominance signal processing apparatus, an image-sensing apparatus and control methods for same, and more particularly, to a chrominance signal processing apparatus, an image-sensing apparatus and control methods for same that make it possible to reduce false color in a high-luminance area of color image data.

BACKGROUND OF THE INVENTION

In order to further an understanding of the present invention, a description will first be given of the conventional method of generating a luminance signal in an image-sensing apparatus.

In the conventional method, in the image-sensing apparatus, an output signal from an image-sensing element such as a charge-coupled device (CCD) is input to a white balance circuit and, after white gain adjustment, is then input to a luminance signal generating circuit. The luminance signal generating circuit produces and outputs a luminance signal.

In addition, the output signal from the white balance adjustment circuit is also input to a color conversion matrix. In the color conversion matrix, a color-difference signal and a luminance signal are generated and input to a chroma suppression (CSUP) circuit. At the chroma suppression circuit, a color difference gain of a high-luminance area of the color-difference signal is suppressed and a suppressed color-difference signal is output. This chroma suppression process is performed in order to prevent the occurrence of false color in the high-luminance region.

In the conventional chroma suppression circuit, the chroma suppression described above is carried out by generating a luminance signal using an R:G:B ratio of 0.3:0.59:0.11 (which is the National Television System Committee (NTSC) luminance generating method) and suppressing chroma according to the level of the luminance signal so generated.

However, as can be appreciated by those of ordinary skill in the art, even with the same luminance the chroma values that can be expressed differ depending on the hue.

For example, if the hue is yellow, then the color can be expressed even if the luminance signal is at a very high level, which is not the case with every hue.

However, if chroma suppression is performed uniformly based on the luminance signal generated according to the NTSC luminance signal composition ratio (of R:G:B ratio of 0.3:0.59:0.11 as described above) using the conventional signal processing unit, there is a tendency to over-suppress chroma beyond what is necessary because the yellow hue the luminance signal reaches a very high level. This is because the blue component, of which not much is contained in the yellow, is also not much of a presence in the luminance signal.

SUMMARY OF THE INVENTION

Accordingly, the present invention was conceived in order to solve the above-described problem of the conventional art, and has as its object to provide a chrominance signal processing apparatus and method capable of providing optimal color processing according to the hue of the color image data, and an image-sensing apparatus capable of mounting the chrominance signal processing apparatus and a method therefor.

The above-described object is attained by providing a chrominance signal processing apparatus adapted to perform color suppression of an image data signal, in which the apparatus has a chroma composition ratio determination means, signal generating means, color suppression rate determining means and color suppression means. The chroma composition ratio determination means determines the chroma composition ratio ($\alpha:\beta:\gamma$) required for color suppression of the image data signal based on a red signal R, a green signal G and a blue signal B contained in the image data signal. The signal generating means generates a chroma suppression signal (Ya) of the image data signal based on the chroma composition ratio. The color suppression rate determining means determines a color suppression rate based on the chroma suppression signal. The color suppression means perform color suppression on the image data signal based on the color suppression rate.

According to the above-described aspect of the present invention, the apparatus first determines the chroma composition ratio ($\alpha:\beta:\gamma$) based on the red R, green G and blue B signals contained in the image data signal and generates a chroma suppression signal (Ya) for the image data signal based on the chroma composition ratio. The apparatus can then perform color suppression of the image data signal using the generated chroma suppression signal, based on a chroma compression rate (G) preset for each signal. As a result, the best color suppression for a given hue can be carried out for each image data.

Preferably, the above-described chroma composition ratio is determined by a red signal R saturation margin that is a difference between the red signal R and a red signal R saturation value, a green signal G saturation margin that is a difference between the green signal G and a green signal G saturation value, and a blue signal B saturation margin that is a difference between the blue signal B and a blue signal B saturation value.

Preferably, the chroma composition ratio determination means sets the chroma composition ratio of a signal indicating the minimum value among the red signal, green signal and blue signal as 1 and sets the chroma composition of signals other than the minimum value as 0.

Preferably, the chroma suppression signal (Ya) is a sum of values obtained by multiplying the red signal R, green signal G and blue signal B by the corresponding chroma composition ratios, such that Ya=R×$\alpha$+R×$\beta$+R×$\gamma$.

Preferably, the color suppression means uses a color suppression rate preset according to the chroma suppression signal.

Additionally, the above-described object of the present invention is also achieved by an image-sensing apparatus adapted to process an image data signal and a red signal R sensed by an image-sensing element. The image-sensing apparatus has the chroma composition ratio determination means, the signal generating means, the color suppression rate determining means and the color suppression means described above.

According to the above-described aspect of the present invention, the apparatus determines the chroma composition ratio ($\alpha:\beta:\gamma$) that is the composition ratio of each of the red R, green G and blue B signals contained in the image data signal that is image-sensed by the image-sensing element and generates a chroma suppression signal (Ya) for the image data signal based on that chroma composition ratio. The apparatus can then perform color suppression of the image data signal using the chroma suppression signal so generated, based on a chroma compression rate (G) that is preset for each signal. As a result, the best color suppression for a given hue can be carried out for each image data.

Additionally, the above-described object of the present invention is also achieved by a control method for controlling a chrominance signal processing apparatus adapted to perform color suppression of an image data signal. The control method has a chroma composition ratio determination step, a signal generating step, a color suppression rate determining step, and a color suppression step. The chroma composition ratio determination step determines a chroma composition ratio ($\alpha$:$\beta$:$\gamma$) required for color suppression of the image data signal based on a red signal R, a green signal G and a blue signal B contained in the image data signal. The signal generating step generates a chroma suppression signal (Ya) of the image data signal based on the chroma composition ratio. The color suppression rate determining step for determining a color suppression rate based on the chroma suppression signal. The color suppression step performs color suppression on the image data signal based on the color suppression rate.

Additionally, the above-described object of the present invention is also achieved by a machine-readable program comprising program code for executing the control method described above, adapted to be executed by an information processing apparatus.

Additionally, the above-described object of the present invention is also achieved by a recording medium on which the above-described program is stored.

Additionally, the above-described object of the present invention is also achieved by a control method for controlling an image-sensing apparatus adapted to process an image data signal and a red signal R sensed by an image-sensing element. The control method has the chroma comp composition ratio determination step, the signal generating step, the color suppression rate determining step, and the color suppression step described above.

Additionally, the above-described object of the present invention is also achieved by a machine-readable program comprising program code for executing the control method described above, adapted to be executed by an information processing apparatus.

Additionally, the above-described object of the present invention is also achieved by a recording medium on which the above-described program is stored.

Other objects, features and advantages of the present invention besides those discussed above shall be apparent to those skilled in the art from the description of a preferred embodiment of the invention which follows. In the description, reference is made to accompanying drawings, which form a part thereof, and which illustrate examples of the invention. Such examples, however, are not exhaustive of the various embodiments of the invention, and therefore reference is made to the claims that follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flow chart of steps in a process of determining the chroma composition ratio of the red, green and blue signals, as performed by a chroma composition ratio determination circuit according to a second embodiment of the present invention.

DETAILED DESCRIPTION OF THE PREFERRED EMBODIMENTS

Preferred embodiments of the present invention, that is, of a chrominance signal processing apparatus and a control method for same, as well as an image-sensing apparatus mounting the chrominance signal processing apparatus and a control method for same, will now be described in detail, with reference to the accompanying drawings. For ease and clarity of explanation, the present description uses a signal processing circuit as the signal processing apparatus.

(First Embodiment)

Figure 1:
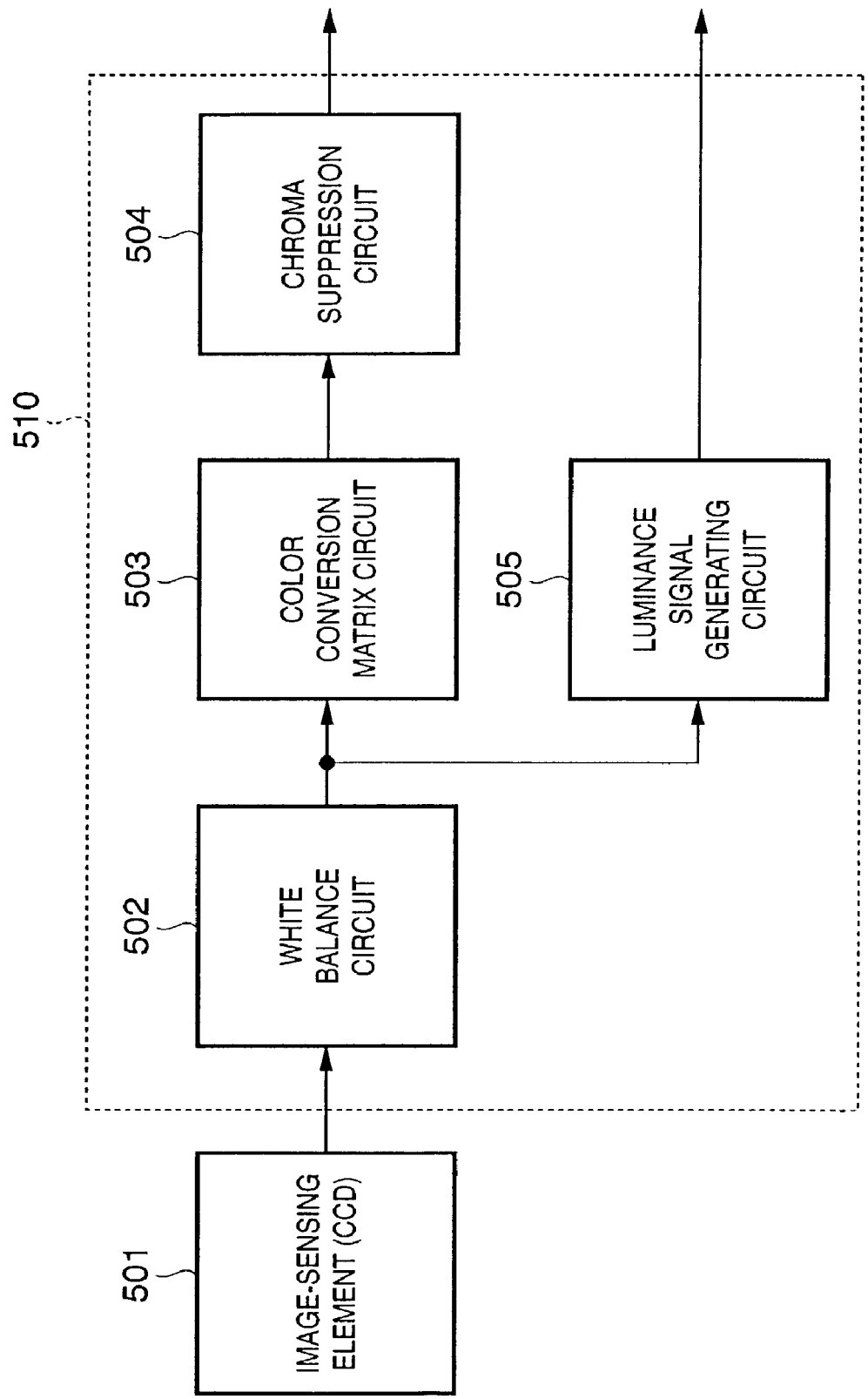
FIG. 1 is a block diagram showing the overall structure of a signal processing circuit according to a first embodiment of the present invention.

FIG. 1 is a block diagram showing the overall structure of a signal processing circuit of an image-sensing apparatus according to a first embodiment of the present invention. As may be appreciated by those of ordinary skill in the art, the area inside the dashed line may also be constituted as an independent, stand-alone chrominance signal processing apparatus 510, separate from an image-sensing apparatus 100 not shown in this diagram.

As shown in FIG. 1, an output signal from an image-sensing element 501 such as a CCD is input to a white balance circuit 502. After the white gain has been adjusted at the white balance circuit 502, the signal is then input to a luminance signal generating circuit 505. The luminance signal generating circuit 505 generates and outputs a luminance signal. It should be noted that what is input to the luminance signal generating circuit 505 are, for example, RGB signals. The luminance signal Y' is given by combining in an appropriate ratio. Thus, for example, Y' may be provided by the following formula:

$$Y'=a*R+b*G+c*B$$

where R, G and B represent signal values of red, green and blue chroma components, respectively. Values such as 0.30, 0.59 and 0.11 may be used for the coefficients a, b and c. These coefficients may be determined according to the white balance, for example.

The output signal from the white balance circuit 502 is input to a color conversion matrix circuit 503. The color conversion matrix circuit 503 generates the luminance signal Y and the color-difference signals Cr, Cb. The components of the luminance signal Y generated by the color conversion matrix circuit 505 do not need to be the same as the luminance signal Y' generated by the luminance signal generating circuit.

The chroma component signals R, G and B and the color-difference signals Cr, Cb generated by the color conversion matrix circuit 503 are input to a chroma suppression (CSUP: chrome suppress) circuit 504. The chroma suppression circuit 504 suppresses a high-luminance region of the color-difference signals Cr, Cb by a method to be described later below, and outputs the color-difference signal.

Figure 2:
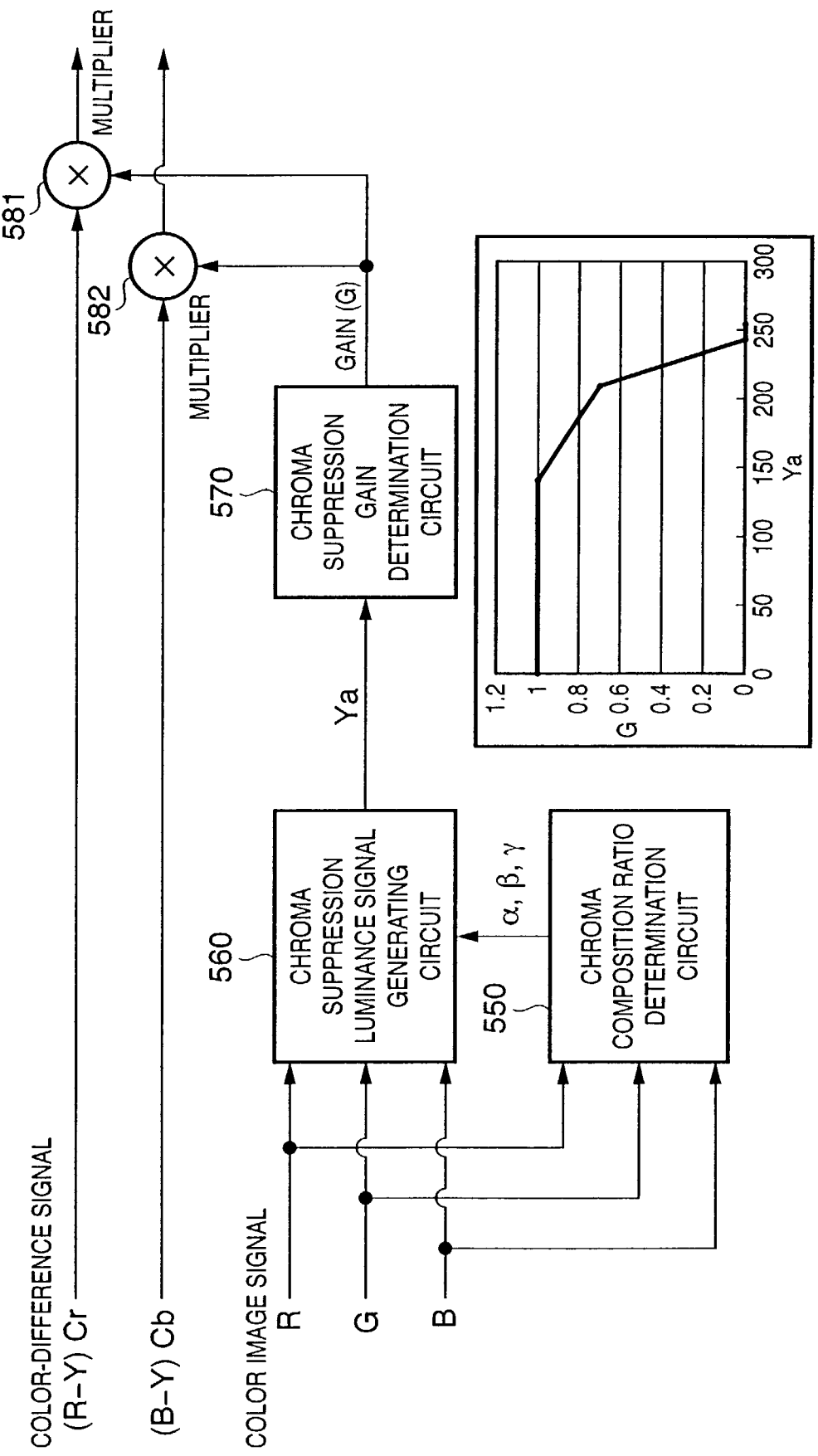
FIG. 2 is a block diagram showing the overall structure of a chroma suppression circuit according to a first embodiment of the present invention.
Figure 3:
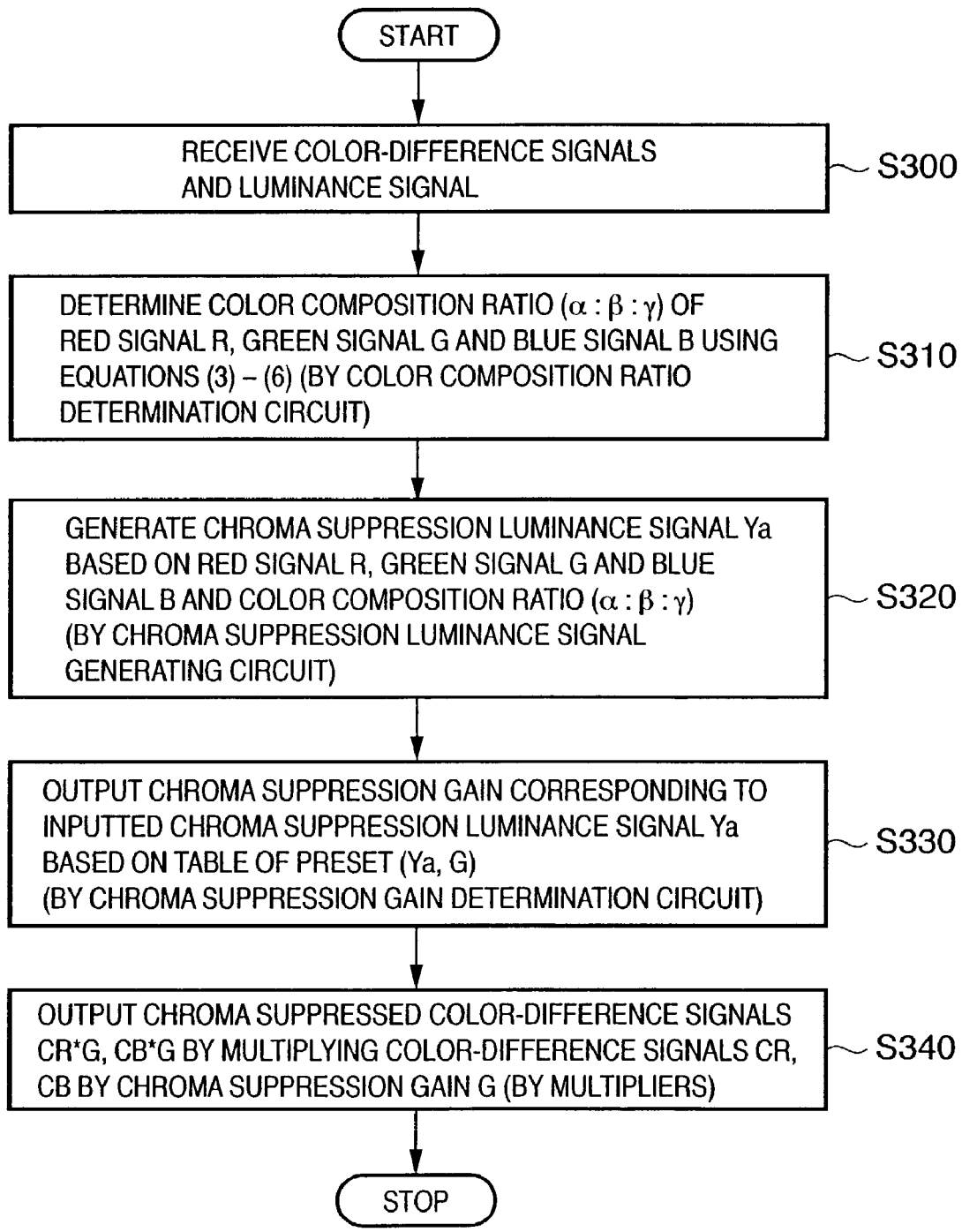
FIG. 3 is a flow chart illustrating steps in a process performed by the chroma suppression circuit according to a first embodiment of the present invention.

FIG. 2 is a block diagram showing the overall structure of a chroma suppression circuit according to a first embodiment of the present invention. FIG. 3 is a flow chart illustrating steps in a process performed by the chroma suppression circuit according to a first embodiment of the present invention.

For ease of explanation, a description will first be given of the processes performed by the suppression circuit 504, with reference to FIG. 2 and FIG. 3.

As shown in FIG. 3, in a step S300, the red signal R, green signal G and blue signal B are input to a chroma suppression luminance signal generating circuit 560 and a chroma composition ratio determination circuit 550.

Next, in a step S310, the chroma composition ratio determination circuit 550 outputs a proportion of red, green and blue signals R G B, that is, a chroma composition ratio ($\alpha:\beta:\gamma$), based on the inputted red signal R, green signal G and blue signal B.

Next, in a step S320, the chroma composition ratio determination circuit 550 generates and outputs a chroma suppression luminance signal Y based on the inputted red signal R, green signal G and blue signal B and on the chroma composition ratio ($\alpha:\beta:\gamma$).

Figure 4:
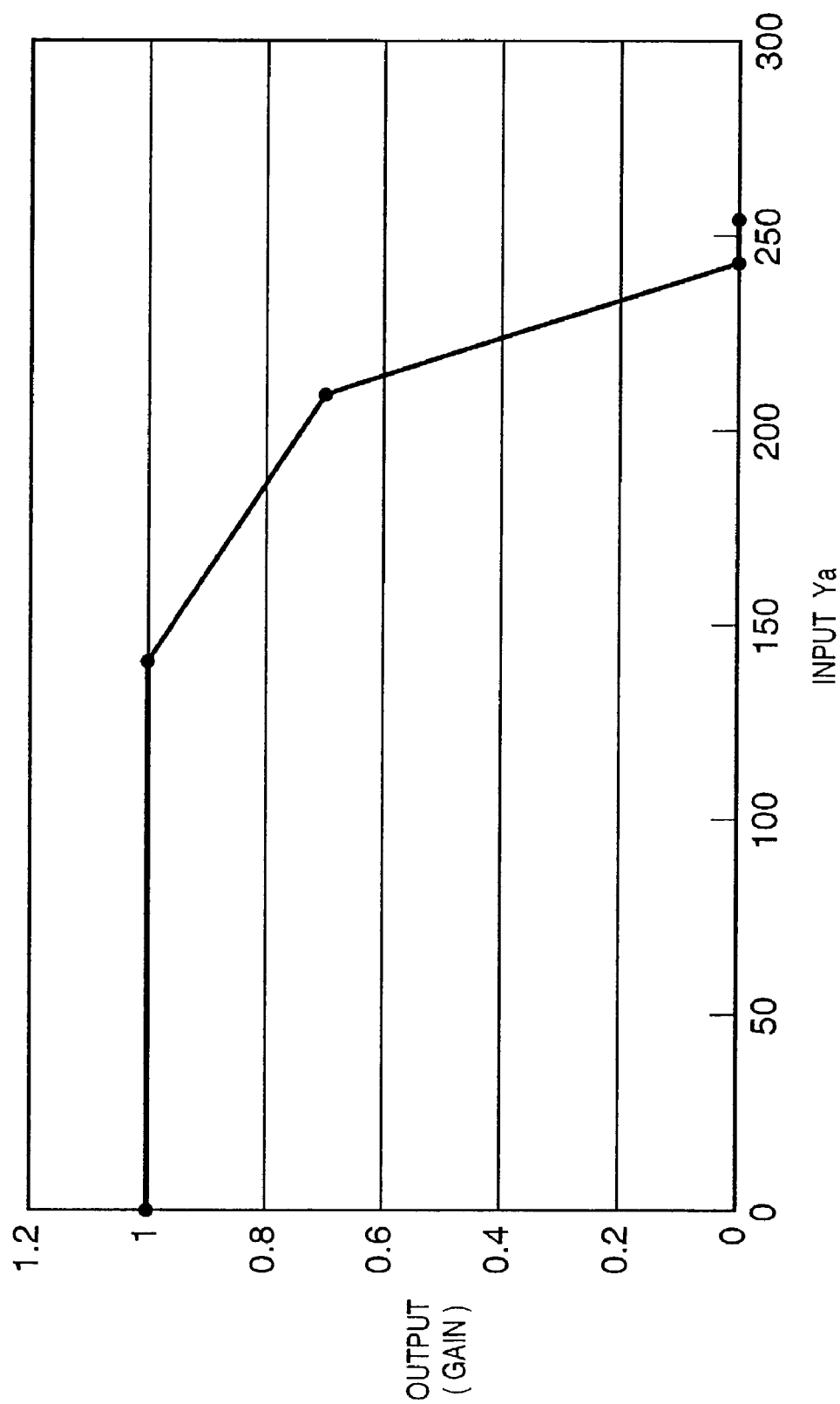
FIG. 4 is a diagram illustrating the relation between color suppression luminance signal and color suppression gain according to a first embodiment of the present invention.

FIG. 4 is a diagram illustrating the relation between color suppression luminance signal and color suppression gain according to a first embodiment of the present invention.

Next, returning to FIG. 3, in a step S330, a chroma suppression gain determination circuit 570 outputs a gain corresponding to an inputted chroma suppression luminance signal Ya, based on a pre-inputted table (not shown in FIG. 4) relating inputted chroma suppression luminance signal Ya to gain (G) setting values.

Next, in a step S340, multipliers 581 and 582 multiply the respective inputted color-difference signals Cr, Cb by the respective gains (G) and output chroma-suppressed color-difference signals (Cr×G, Cb×G).

(Chroma Suppression Luminance Signal Ya)

A detailed description will now be given of the chroma-suppressed color-difference signals (Cr×G, Cb×G) generated by the chroma suppression circuit 504 described above.

First, a description will be given of the chroma suppression luminance signal Ya generated by the chroma suppression luminance signal generating circuit 560.

If the chroma composition ratio of the red, green and blue signals R G B that correspond to the output signal from the image-sensing element 501 is $\alpha:\beta:\gamma$, then the chroma suppression luminance signal Ya can be defined by the following equation (1):

$$Ya = \alpha R + \beta G + \gamma B \quad (1)$$

$$\text{where} \alpha + \beta + \gamma = 1 \quad (2)$$

The chroma composition ratio determination circuit 550 exists to determine the above-described $\alpha$, $\beta$ and $\gamma$.

If the saturation margins for the red signal R, the green signal G and the blue signal B are R_Rev, G_Rev and B_Rev, and if the saturation point for the signals is NP, then the saturation margin can be defined according to the following equations (3), (4) and (5):

$$R\_Rev = NP - R \quad (3)$$

$$G\_Rev = NP - G \quad (4)$$

$$B\_Rev = NP - B \quad (5)$$

From the equations (2) and (3)–(5) for the saturation margin for each color, the respective chroma composition ratios $\alpha$, $\beta$, $\gamma$ for the red signal R, green signal G and blue signal B can be determined according to the following equations (6), (7) and (8):

$$\alpha = R\_Rev/(R\_Rev + G\_Rev + B\_Rev) \quad (6)$$

$$\beta = G\_Rev/(R\_Rev + G\_Rev + B\_Rev) \quad (7)$$

$$\gamma = B\_Rev/(R\_Rev + G\_Rev + B\_Rev) \quad (8)$$

Therefore, the chroma composition ratio determination circuit 550 can generate and output the chroma composition ratio $\alpha:\beta:\gamma$ using the red signal R, green signal G, blue signal B as well as equations (6), (7) and (8).

Similarly, the chroma suppression luminance signal generating circuit 560 can generate and output the chroma suppression luminance signal Ya using the received red signal R, green signal G and blue signal B, the chroma composition ratio $\alpha:\beta:\gamma$ and equation (1).

Similarly, the chroma suppression gain determination circuit 570 can output a gain (G) corresponding to the inputted chroma suppression luminance signal Ya based on a pre-inputted table (not shown in FIG. 4) relating inputted chroma suppression luminance signals and gain (G) setting values.

Finally, the multipliers 581, 582 can multiply the chrominance signals (Cr, Cb) by the gain (G) determined by the chroma suppression gain determination circuit 570 and output suppressed chrominance signals (Cr×G, Cb×G).

A consideration of the meaning of equation (1) shows that the luminance signal Ya that is the reference for chroma suppression is given by the weighted average of the chroma components, in which the saturation margin of the chroma components is weighted. That is, the chroma component having the largest saturation margin becomes the main component of the luminance signal Ya. The chroma component having the largest saturation margin for a given hue corresponds to the complementary color for that hue.

In other words, in the present embodiment, a luminance signal Ya is calculated according to the signal value of the chroma component that corresponds to the complementary color of the hue expressed by the image signal. Then, using that luminance signal Ya as a reference, the gain is determined and chroma suppression carried out. As a result, for example, for an image signal expressing the color yellow, the luminance signal Ya is calculated according to the value of the blue component signal B that is the complementary color for yellow. In an image signal expressing the color yellow, the signal value of B is relatively small compared to the other components, so the luminance signal Ya will also be a relatively small value. The smaller the value for the luminance signal Ya, the greater the corresponding gain (see FIG. 4), and the more difficult is becomes to suppress the color-difference signals. As a result, an image signal that expresses the color yellow is difficult to suppress even at high-luminance. As a result, even an image signal expressing a high-luminance yellow can still be accurately reproduced and recorded according to the original image signal generated at the image-sensing element.

An illustrative example of the above-described process will now be described in detail.

$$(R, G, B)=(240, 230, 50) \quad \text{Example 1}$$

In this example, these values represent a yellow hue. Additionally, the saturation point is 256.

The saturation margins (R_Rev, G_Rev, B_Rev) for the red signal R, green signal G and blue signal B can be obtained using formulas (3), (4) and (5).

$$R\_Rev=NP-R=256-240=16$$

$$G\_Rev=NP-G=256-230=26$$

$$B\_Rev=NP-B=256-50=206$$

Accordingly, the respective chroma composition ratios α, β, γ of the red signal R, green signal G and blue signal B can be obtained using equations (6), (7) and (8).

$$\alpha = R\_Rev/(R\_Rev + G\_Rev + B\_Rev) \quad (6)$$
$$= 16/(16+26+206) = 0.0645$$

$$\beta = G\_Rev/(R\_Rev + G\_Rev + B\_Rev) \quad (7)$$
$$= 26/(16+26+206) = 0.1048$$

$$\gamma = B\_Rev/(R\_Rev + G\_Rev + B\_Rev) \quad (8)$$
$$= 206/(16+26+206) = 0.8306$$

Accordingly, the chroma suppression luminance signal Ya can be obtained using equation (1). In other words, when (R, G, B)=(240, 230, 50), the chroma suppression luminance signal Ya can be obtained using equation (9).

$$Ya=0.0645\times R; 0.1048\times G+0.8306\times B \quad (9)$$

The contribution ratio of the red signal R, green signal G and blue signal B in equation (9) above is approximately 6 percent, 10 percent and 83 percent, respectively.

That is, for an image signal corresponding to yellow as indicated by an (R, G, B)=(240, 230, 50), a chroma suppression luminance signal in which the complementary color blue signal B occupies a large proportion is generated. The chroma suppression gain (G) is a function of the chroma suppression luminance signal Ya (see FIG. 4), so for an image signal where (R, G, B)=(240, 230, 50), chroma suppression is performed mainly in reference to the blue signal B.

Figure 5:
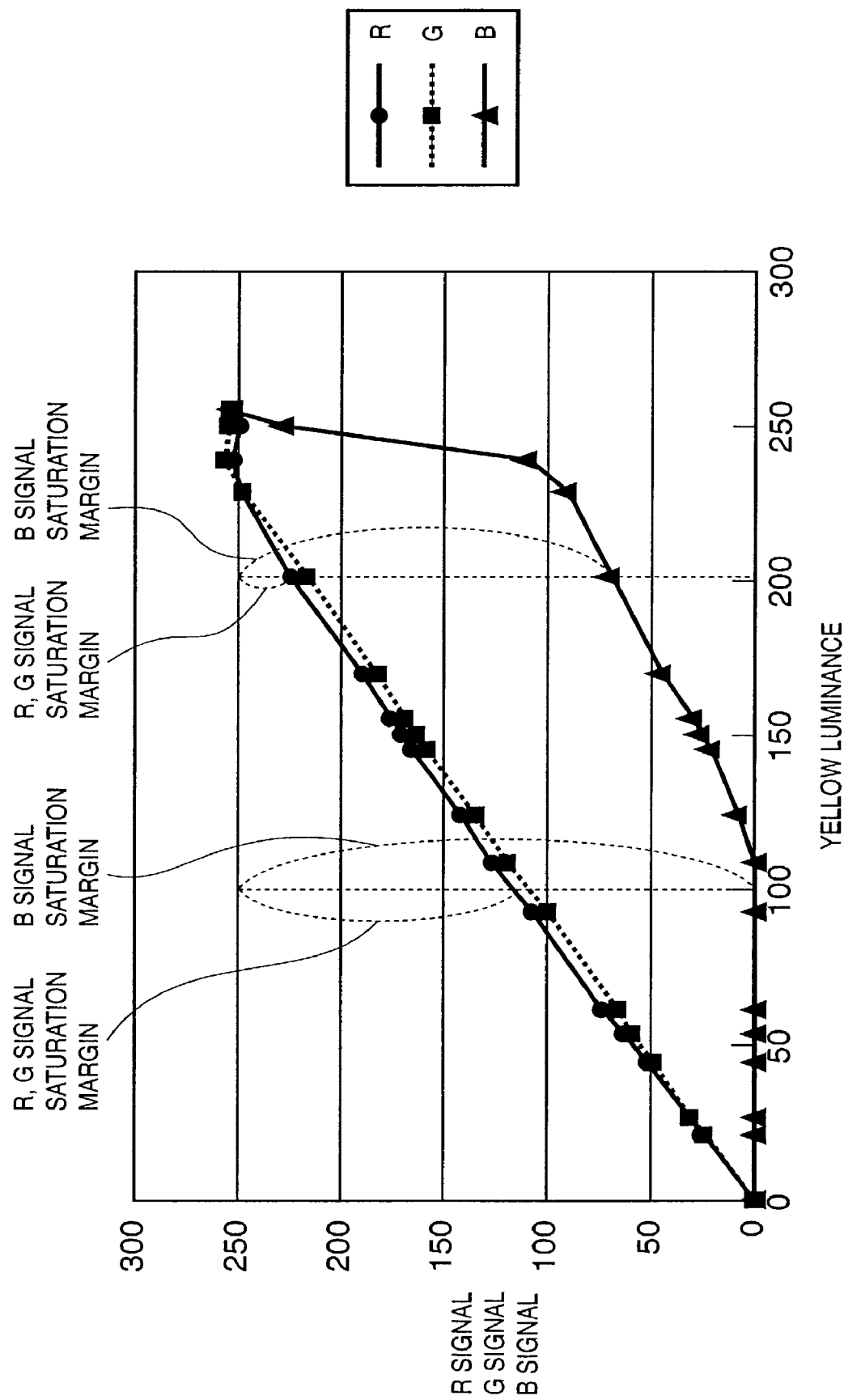
FIG. 5 is a diagram illustrating the relation between luminance and red signal R, green signal G and blue signal B in a yellow hue.

FIG. 5 is a diagram illustrating the relation between luminance and red signal R, green signal G and blue signal B in a yellow hue.

As shown in FIG. 5, increasing the luminance signal from 0 to 256 while keeping the yellow hue increases the red signal R and the green signal G substantially in proportion to the increase in the luminance signal, while the saturation margin for the red signal R and the green signal G decreases substantially in inverse proportion to the increase in the luminance signal. At the same time, the blue signal B is 0 if the luminance signal is 100 or less and its saturation margin is 256. The blue signal B increases gradually when the luminance signal exceeds 100, although its saturation margin is large compared to the saturation margins of the red signal R and green signal G.

From the foregoing and from FIG. 5, it can be understood that the B signal is the most significant signal for determining the saturation margin. Additionally, in the example shown in FIG. 5, yellow and blue are complementary colors. In other words, the saturation point for a given color correlates with the saturation margin of the complementary color for that color. The same holds true for the other hues as well.

That is, for each chrominance signal, the signal of the chroma component that corresponds to the complementary color for a given hue is the most significant signal for determining the saturation point for that hue.

Thus, as described above, the inventors of the present application determined that, for chroma suppression, it is advantageous to determine the saturation point of the target color and to carry out chroma suppression based on that saturation point. As described above, the complementary color signal for the target color may be used for the saturation point.

Accordingly, with the above-described first embodiment of the present invention, a signal value corresponding to a complementary signal can be obtained using the structure described with reference to FIG. 1 and FIG. 2.

As described above, with the first embodiment, false color signals in high-luminance regions of target hues can be effectively reduced without excessive chroma suppression. This effect is especially noticeable with respect to signals expressing the color yellow.

It should be noted that, in the present embodiment, it is assumed that the output signal from the CCD 501 is an RGB signal. However, those of ordinary skill in the art can appreciate, the configuration of the present embodiment is equally adaptable to a case in which the output signal is a YMC signal.

Additionally, the output signal of the chrominance signal processing apparatus corresponds to the YUV signal or NTSC signal composed of sets of luminance signals and color-difference signals. This output signal is recorded as is by a semiconductor recording apparatus or magnetic recording apparatus and displayed by an image display apparatus. An apparatus combining a semiconductor recording apparatus or magnetic recording apparatus and an image display apparatus with the image-sensing apparatus of FIG. 1 is realized as a digital still camera or a digital video camera.

Alternatively, the output signal from the chrominance signal processing apparatus 510 is once again converted to an RGB signal and either recorded or displayed. Or, the output signal may be input to a video printer or the like and a hard copy printed.

(Second Embodiment)

A description will now be given of a second embodiment of the present invention, with reference to the drawings.

In the first embodiment of the present invention as described above, for each target hue such as yellow, for example, the chroma suppression luminance signal is generated based on the chroma composition ratio (α:β:γ) of the target color, with chroma suppression carried out on the basis of the signal thus generated. As a result, false color signals in high-luminance regions of target hues can be effectively reduced without excessive chroma suppression.

By contrast, a description will now be given of a second embodiment of the present invention that pertains to a chrominance signal processing apparatus and an image-sensing apparatus mounting the chrominance signal processing apparatus and that achieves substantially the same effect as the first embodiment described above and substantially decreasing the scale of the circuitry by adapting hardware components.

Figure 6:
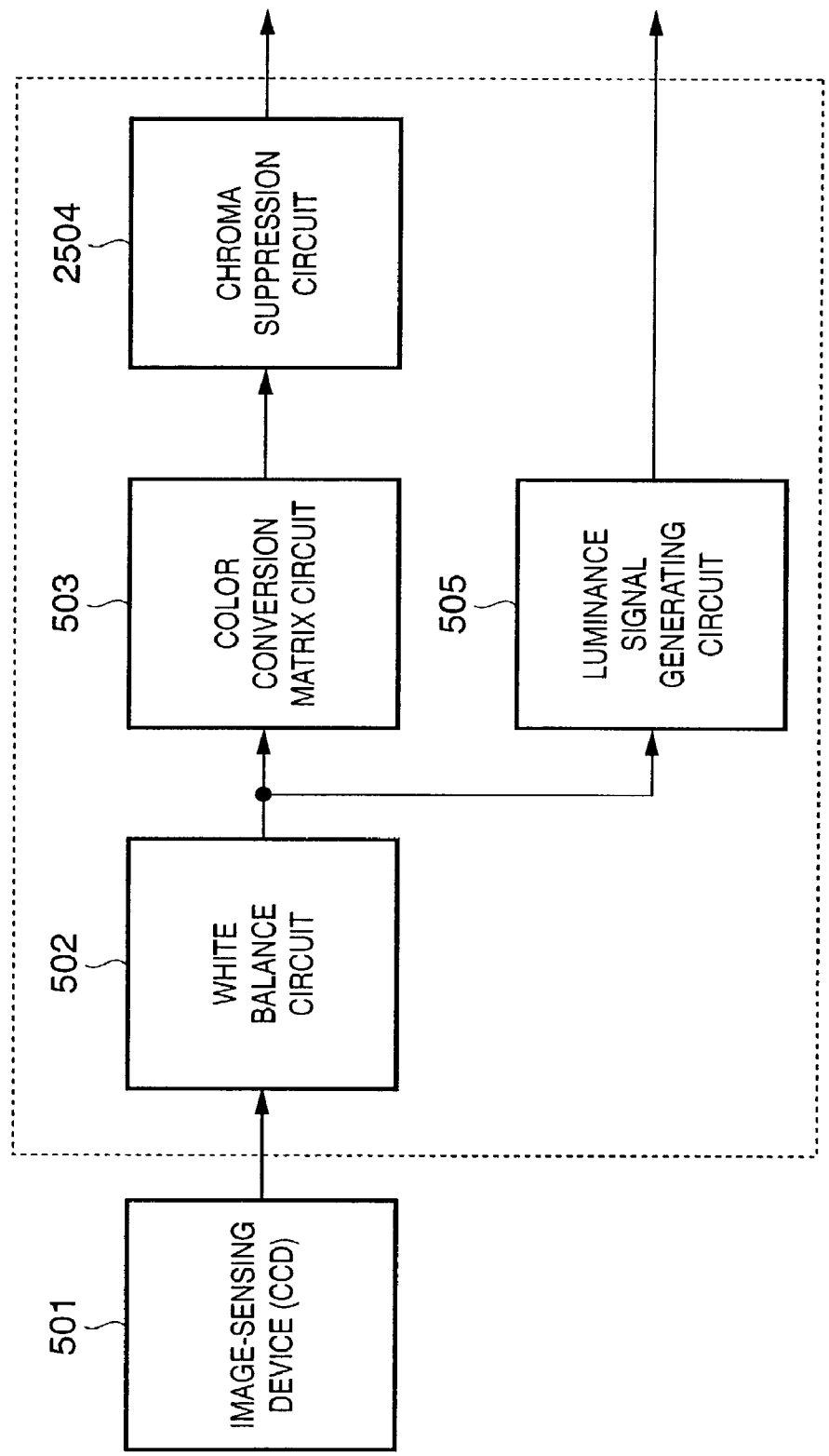
FIG. 6 is a block diagram showing the overall structure of a signal processing circuit according to a second embodiment of the present invention.

FIG. 6 is a block diagram showing the overall structure of a signal processing circuit according to a second embodiment of the present invention.

As shown in FIG. 6, the area inside the dashed line may also be constituted as an independent, stand-alone chrominance signal processing apparatus.

It should be noted that, except for the chroma suppression circuit 2504, the structure of an image-sensing apparatus 200 of the second embodiment is identical to the structure of the image-sensing apparatus 100 of the first embodiment as described with reference to FIG. 1, so a detailed description thereof is omitted a description given instead of the chroma suppression circuit 2504 that is the distinctive feature of the second embodiment, with reference to FIGS. 7, 8 and 9.

Figure 7:
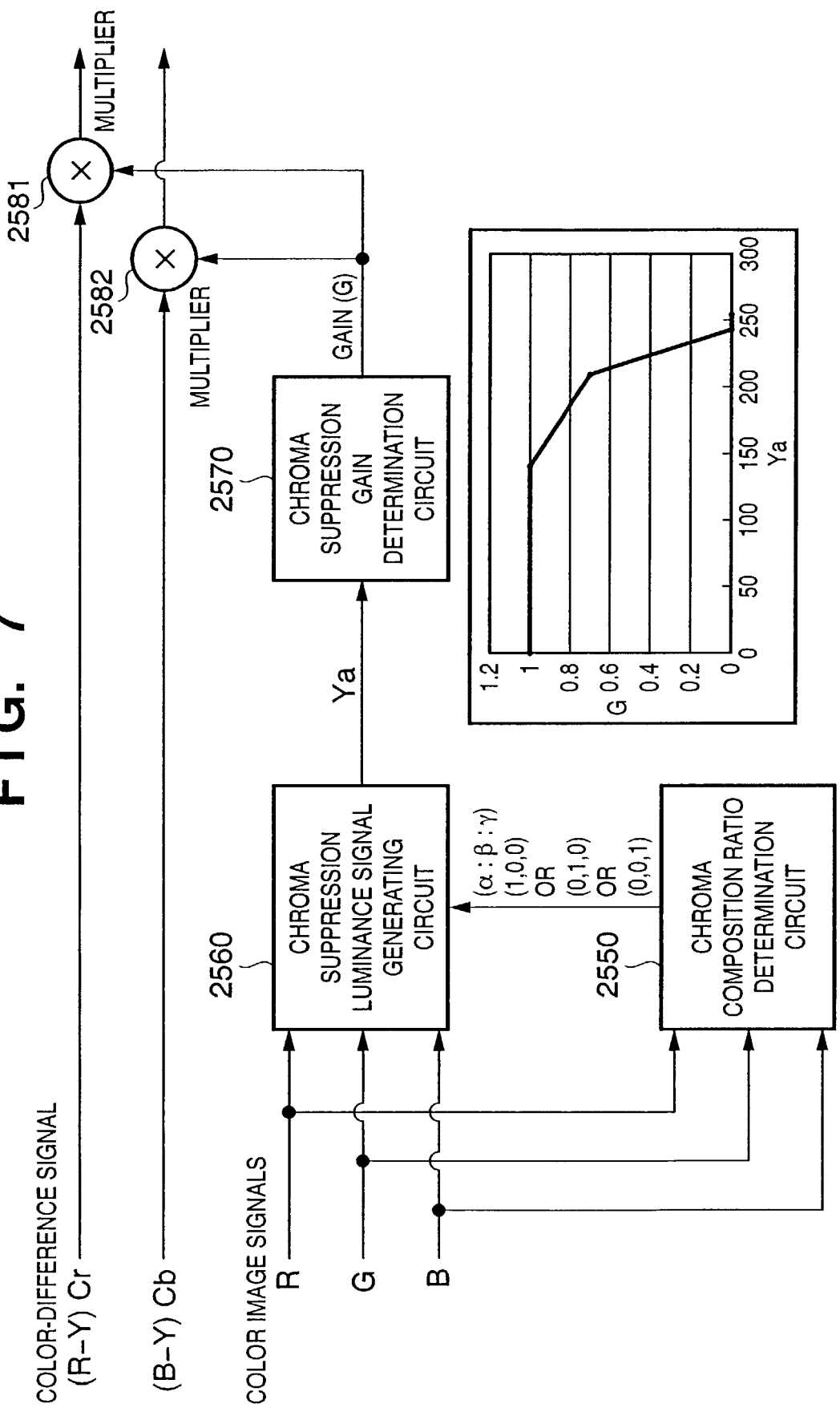
FIG. 7 is a block diagram showing the overall structure of a chroma suppression circuit according to a first embodiment of the present invention.

FIG. 7 is a block diagram showing the overall structure of a chroma suppression circuit according to a first embodiment of the present invention. FIG. 8 is a flow chart illustrating steps in a process performed by a chroma suppression circuit according to a second embodiment of the present invention. FIG. 9 is a flow chart of steps in a process of determining the chroma composition ratio of the red, green and blue signals, as performed by a chroma composition ratio determination circuit according to a second embodiment of the present invention.

The chroma suppression circuit 2504 shown in FIG. 7 is similar in structure to the chroma suppression circuit 504 of the first embodiment of the present invention described above, so a description of those points in common between these two circuits is omitted. What is given below is a summary description of the chroma suppression circuit 2504 and those points that differ as between the chroma suppression circuit 2504 of the second embodiment and the chroma suppression circuit 2504 of the first embodiment.

For ease and clarity of explanation, a description will first be given of the processes performed by the chroma suppression circuit 2504, using FIG. 7 and FIG. 8.

Figure 8:
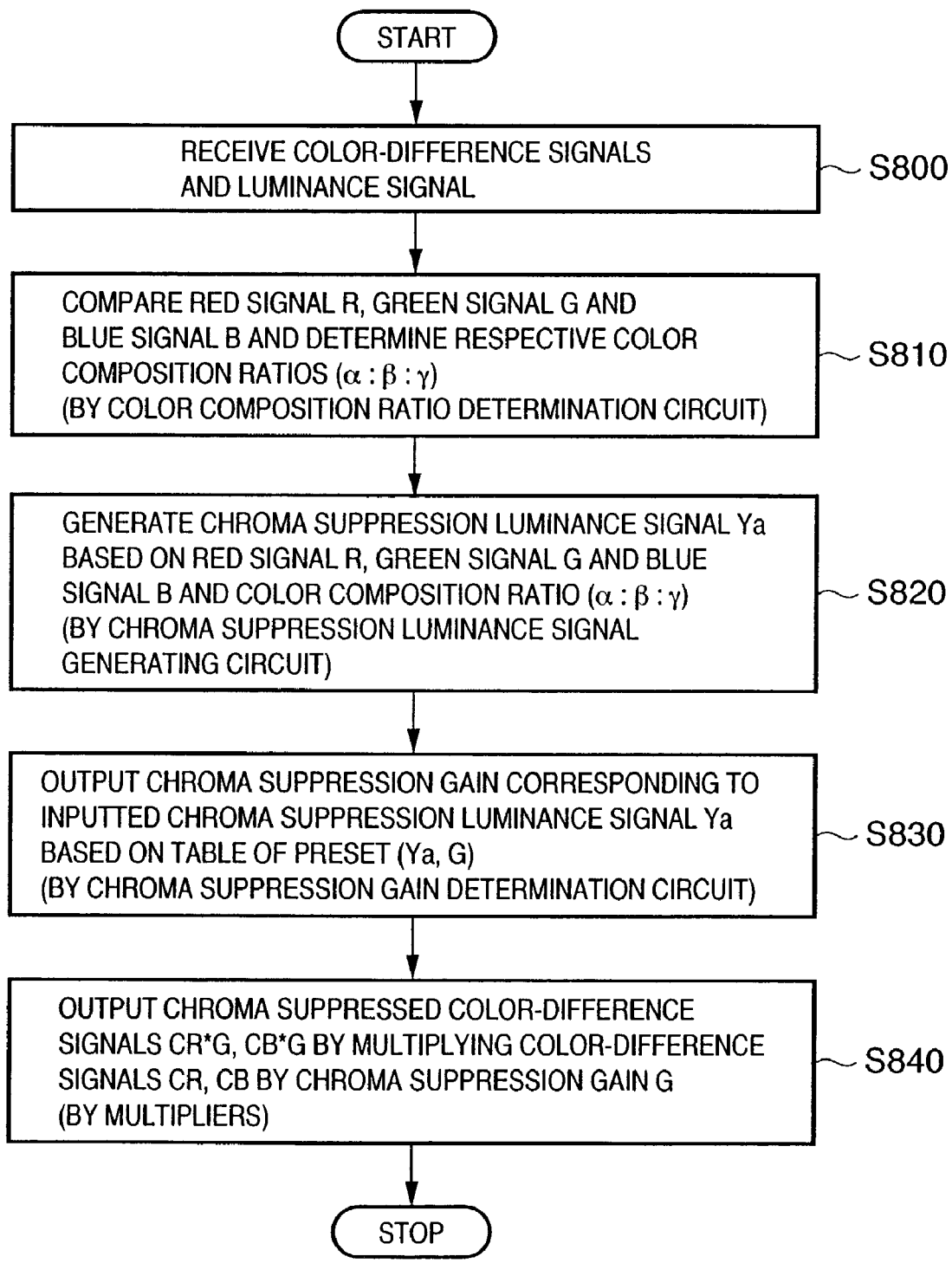
FIG. 8 is a flow chart illustrating steps in a process performed by a chroma suppression circuit according to a second embodiment of the present invention.

In FIG. 8, in a step S800, a red signal R, green signal G and blue signal B are input to a chroma suppression luminance signal generating circuit 2560 and a chroma composition ratio determination circuit 2550.

Next, in a step S810, the chroma composition ratio determination circuit 2550 compares the input red, green and blue signals and, on the basis of the results of that comparison, outputs a chroma composition ratio ($\alpha$:$\beta$:$\gamma$) for the red signal R, green signal G and blue signal B, respectively. A detailed description of the chroma composition ratio ($\alpha$:$\beta$:$\gamma$), output is given with reference to the flow chart of FIG. 9.

In a step S811 of FIG. 9, the inputted red signal R, green signal G and blue signal B are compared and, in a succeeding step S812, the smallest of these red, green and blue signals is detected.

If in step S812 it is determined that the red signal R is the smallest of the three signals, then the process proceeds to a step S813. If in step S812 it is determined that the green signal G is the smallest of the three signals, then the process proceeds to a step S814. If in step S812 it is determined that the blue signal B is the smallest of the three signals, then the process proceeds to a step S815.

In steps S813, S814 and S815 the following settings are performed and the process then proceeds to a step S816.

In other words, if in step S812 it is determined that the red signal R is the smallest of the three signals, then in step S813 the chroma composition ratio of the red signal R, green signal G and blue signal B $\alpha$:$\beta$:$\gamma$ is set at $\alpha$=1, $\beta$=0 and $\gamma$=0. If in step S812 it is determined that the green signal G is the smallest of the three signals, then in step S814 the chroma composition ratio of the red signal R, green signal G and blue signal B $\alpha$:$\beta$:$\gamma$ is set at $\alpha$=0, $\beta$=1 and $\gamma$=0. If in step S812 it is determined that the blue signal B is the smallest of the three signals, then in step S815 the chroma composition ratio of the red signal R, green signal G and blue signal B $\alpha$:$\beta$:$\gamma$ is set at $\alpha$=0, $\beta$=0 and $\gamma$=1. The chroma composition ratios ($\alpha$:$\beta$:$\gamma$) for the respective color signals are then output in a step S816.

Next, in a step S820 of FIG. 8, the chroma suppression luminance signal generating circuit 2560 generates and outputs a chroma suppression luminance signal Ya based on the inputted red signal R, green signal G and blue signal B and chroma composition ratio ($\alpha$:$\beta$:$\gamma$).

Next, in a step S830, the chroma suppression gain determination circuit 570 outputs a gain (G) corresponding to the inputted chroma suppression luminance signal Ya, based on a pre-inputted table (not shown) relating inputted chroma suppression luminance signal Ya to gain (G) setting values.

Next, in a step S840, multipliers 581, 582 multiply each of the inputted color-difference signals (Cr, Cb) by the gain (G) and output suppressed color-difference signals (Cr×G, Cb×G).

In so doing, the chroma suppression circuit 2504 can output suppressed color-difference signals (Cr×G, Cb×G) from the gain determined by the red signal R, green signal G and blue signal B and the color-difference signals Cr, Cb.

An illustrative example of the above-described process will now be described in detail.

$(R, G, B) = (240, 230, 50)$ Example:

In this general example using red signals R, green signals G and blue signals B, these values represent a yellow hue.

In the present example, in step S810 of FIG. 8, the blue signal B is the smallest signal and so the color composition ratio ($\alpha$:$\beta$:$\gamma$) is set at $\alpha$=0, $\beta$=0, $\gamma$=1). In step S820, the chroma suppression luminance signal Ya=B.

In other words, in the above process, by selecting the smallest signal value among inputted red signal R, green signal G and blue signal B, setting the color composition ratio for that signal at 1 and setting the color composition ratios for the remaining signals at 0, the chroma suppression luminance signal can be determined. In the present example, the blue signal B is selected as the chroma suppression luminance signal.

The process described above is the same for other colors as well, and so a detailed description thereof is omitted.

In other words, the red signal R undergoes chroma suppression based on either the green signal G or the blue signal B, the green signal G undergoes chroma suppression based on either the red signal R or the blue signal B, the blue signal B undergoes chroma suppression based on either the red signal R or the green signal G, magenta (MG) undergoes chroma suppression based on the green signal G, the yellow (Ye) undergoes chroma suppression based on the blue signal B, and cyan (Cy) undergoes chroma suppression based on the red signal R.

(Comparison of the First and Second Embodiments)

A Detailed Description is Now Given of How, at luminance level requiring chroma suppression, the chroma suppression luminance signal obtained by the second embodiment of the present invention is a coefficient having substantially the same color composition ratio as the chroma suppression luminance signal of the first embodiment of the present invention, by comparing the chroma suppression luminance signal of the second embodiment with the chroma suppression luminance signal of the first embodiment.

Assume that the target hue of the present example is the color red. Specifically, the description will proceed on the assumption that the R, G, B=255, 100, 101, which is a red hue.

Calculations of the chroma suppression luminance signal of the first embodiment and the chroma suppression luminance signal of the second embodiment yield the following:

(In the Case of the First Embodiment)

The saturation margins for the red signal R, green signal G and blue signal B, respectively, can be obtained using equations (3), (4) and (5). In other words:

$$R\_Rev = NP - R = 256 - 255 = 1$$

$$G\_Rev = NP - G = 256 - 100 = 156$$

$$B\_Rev = NP - B = 256 - 101 = 155$$

Accordingly, the color composition ratios ($\alpha:\beta:\gamma$) for the red signal R, green signal G and blue signal B can be obtained using equations (6), (7) and (8). In other words:

$$\alpha = R\_Rev/(R\_Rev + G\_Rev + B\_Rev) = 0.003$$

$$\beta = G\_Rev/(R\_Rev + G\_Rev + B\_Rev) = 0.05$$

$$\gamma = B\_Rev/(R\_Rev + G\_Rev + B\_Rev) = 0.497$$

By substituting the values $\alpha=0.003$, $\beta=0$ and $\gamma=0.497$ into equation (1), in the second embodiment the mathematical expression of the chroma suppression luminance signal Ya can be obtained as follows:

$$Ya = 0.003 \times R + 0.5 \times G + 0.497 \times B \quad (10)$$

Rounding 0.497 to 0.5 yields equation (11):

$$Ya = 0 \times R + 0.5 \times G + 0.5 \times B \quad (11)$$

With respect to a red hue, the change in luminance of the color red is substantially the same for the green signal G and the blue signal B. In other words, the green signal G and the blue signal B show substantially the same amount of change with respect to changes in the luminance of the color red as do the red signal R and the green signal G as shown in the relation between the RGB signals and change sin the luminance of the color yellow as depicted in FIG. 5. As a result, equation (11) yields equation (12):

$$Ya = G \text{ OR } Ya = B \quad (12)$$

(Comparison)

Thus, chroma suppression luminance signal Ya=B in the second embodiment of the present invention as described above in equation (9) as shown in equation (9) is substantially identical to the approximated chroma suppression luminance signal Ya=B in the first embodiment of the present invention as shown in equation (12).

From the foregoing fact, a chroma suppression luminance signal Ya of the second embodiment of the present invention can be obtained that is substantially identical to the chroma suppression luminance signal Ya of the first embodiment of the present invention.

It should be noted that although the foregoing description uses red as the target hue, it applies equally well where the target hue is green or blue.

Similarly, substantially the same effects are obtained with respect to yellow, cyan and magenta as well, as described above with respect to the color yellow. It should be noted that, in the case of intermediate colors such as orange and yellow-green, approximations carried out with equations similar to equation (11) described above do result in somewhat larger margins of error. Such errors, however, are not very large, and the method of the present invention can be adapted thereto.

It should be noted that although the chroma composition ratio determination circuit 550 of the first embodiment described above needs to perform division in order to execute the calculations of equations (6) through (8), the chroma composition ratio determination circuit 2550 of the second embodiment described above simply selects the minimum value among the red, green and blue signals.

Accordingly, compared to the image-sensing apparatus of the first embodiment, the scale of the circuitry of the image-sensing apparatus of the second embodiment can be greatly reduced because a dividing circuit is not required, thus simplifying hardware configuration as well.

(Other Embodiments)

It should be noted that the present invention is equally adaptable to a system comprising of a plurality of instruments (such as, for example, a host computer, an interface, a reader, a printer, etc.) as well as a systems comprising a single piece of equipment (for example, a copier, a facsimile machine and the like).

Additionally, those skilled in the art can appreciate that the object of the present invention is achieved also by supplying a storage medium (or recording medium) on which a software program code is recorded to a system or an apparatus, the system or apparatus reading and executing the program code stored in the storage medium by the computer (or CPU or MPU). In such a case, the program code itself read from the storage medium realizes the functions of the above-described embodiment, and the storage medium storing that program code constitutes the invention. Additionally, the functions of the above-described embodiments are achieved not only by a computer executing the read program code but also by the operating system loaded into the computer performing some or all of the actual processes described above based on the instructions of that program code.

Further, the functions of the above-described embodiments are also achieved by a case in which, once the program code read from the storage medium is written to a function expansion card inserted into the computer or a function expansion unit connected to the computer, based on the instructions of that program code, a CPU or the like to which such function expansion card or function expansion unit is operably connected performs some or all of the actual processes described above.

In a case in which the present invention is adapted to the storage medium described above, program code corresponding to the flow charts shown in FIGS. 3, 8 and 9 described above is stored in that storage medium.

As described above, the present invention provides a chrominance signal processing apparatus and method capable of providing optimal color processing according to the hue of the color image data, and an image-sensing apparatus capable of mounting the chrominance signal processing apparatus and a method therefor.

The present invention is not limited to the above embodiments and various changes and modifications can be made within the spirit and scope of the present invention. Therefore to apprise the public of the scope of the present invention, the following claims are made.

What is claimed is:

1. An image sensing apparatus adapted to perform color suppression of an image data signal, comprising:

a white balance unit that adjusts the image data signal and outputs white balance adjusted image signal;

a chroma composition ratio determination unit arranged to determine a chroma composition ratio ($\alpha:\beta:\gamma$) required for color suppression of the white balance adjusted image signal based on a red signal R, a green signal G and a blue signal B contained in the white balance adjusted image signal;

a signal generator arranged to generate a chroma suppression signal (Ya) of the white balance adjusted image signal based on the chroma composition ratio;

a color suppression rate determining unit arranged to determine a color suppression rate based on the chroma suppression signal; and a color suppressor arranged to perform color suppression on the white balance adjusted image signal based on the color suppression rate, wherein the chroma composition ratio determination unit sets the chroma composition ratio of a signal indicating the minimum value among the red signal, green signal and blue signal as 1, and sets the chroma composition of signals other than the minimum value as 0.

2. The image sensing processing apparatus according to claim 1, wherein the chroma composition ratio is determined by a red signal saturation margin that is a difference between the red signal R and a red signal R saturation value, a green signal saturation margin that is a difference between the green signal G and a green signal G saturation value, and a blue signal saturation margin that is a difference between the blue signal B and a blue signal B saturation value.

3. The image sensing apparatus according to claim 1, wherein the chroma suppression signal (Ya) is a sum of values obtained by multiplying the red signal R, green signal G and blue signal B by the corresponding chroma composition ratios, such that Ya=R×$\alpha$+R×$\beta$+R×$\gamma$.

4. The image sensing apparatus according to claim 1, wherein the color suppressor uses a color suppression rate preset according to the chroma suppression signal.

5. A control method for controlling an image sensing apparatus adapted to perform color suppression of an image data signal, the method comprising:

a white balance step of adjusting the inputted image data signal and outputs white balance adjusted image signal;

a chroma composition ratio determination step for determining a chroma composition ratio ($\alpha:\beta\gamma$) required for color suppression of the white balance adjusted image signal, based on a red signal R, a green signal G and a blue signal B contained in the white balance adjusted image signal outputted in said white balance step;

a signal generating step for generating a chroma suppression signal (Ya) of the white balance adjusted image signal based on the chroma composition ratio;

a color suppression rate determining step for determining a color suppression rate based on the chroma suppression signal; and a color suppression step for performing color suppression on the white balance adjusted image signal based on the color suppression rate, wherein the chroma composition ratio determination step sets the chroma composition ration of a signal indicating the minimum value among the red signal, green signal and blue signal as 1 and sets the chroma composition of signals other than the minimum value as 0.

6. The control method according to claim 5, wherein the chroma composition ratio is determined by a red signal saturation margin that is a difference between the red signal R and a red signal R saturation value, a green signal saturation margin that is a difference between the green signal G and a green signal G saturation value, and a blue signal saturation margin that is a difference between the blue signal B and a blue signal B saturation value.

7. The control method according to claim 5, wherein the chroma suppression signal (Ya) is a sum of values obtained by multiplying the red signal R, green signal G and blue signal B by the corresponding chroma composition ratios, such that Ya=R×$\alpha$+R×$\beta$+R×$\gamma$.

8. The control method according to claim 5, wherein the color suppression step uses a color suppression rate preset according to the chroma suppression signal.

9. A program comprising computer-readable program code recorded on a computer-readable medium for executing the control method according to claim 5, adapted to be executed by an information processing apparatus.

10. An image-sensing apparatus adapted to perform color suppression of an image data signal, having:

an input unit that inputs the image data signal;

a white balance unit that adjusts the image data signal inputted by said input unit and outputs white balance adjusted signal;

a chroma composition ratio determination unit that determines a chroma composition ratio ($\alpha:\beta:\gamma$), required for color suppression of the white balance adjusted signal, of a red signal R, a green signal G and a blue signal B contained in the white balance adjusted signal outputted by said white balance unit;

a signal generating unit that generates a luminance signal (Ya) for chroma suppression of the white balance adjusted signal based on the chroma composition ratio;

a color suppression rate determining unit that determines a color suppression rate based on the luminance signal;

a color difference signal generation unit that generates color difference signals from the red signal R, the green signal G and the blue signal B contained in the white balance adjusted signal by separating from luminance component; and a color suppression unit that performs color suppression on the color difference signals indicating chroma component generated by said color difference signal generation unit based on the color suppression rate.

11. An image-sensing apparatus adapted to process a red signal R, a green signal G and a blue signal B of an image data signal, comprising:

an input unit which inputs the image signal obtained from an image-sensing element;

a white balance unit that adjusts the image data signal inputted by said input unit and outputs white balance adjusted image signal;

a chroma composition ratio determination unit that determines a chroma composition ratio ($\alpha:\beta\gamma$) required for color suppression of the white balance adjusted image signal based on a red signal R, a green signal G and a blue signal B contained in the white balance adjusted image signal;

a signal generator that generates a chroma suppression signal (Ya) of the white balance adjusted image signal based on the chroma composition ratio;

a color suppression rate determining unit that determines a color suppression rate based on the chroma suppression signal; and a color suppressor that performs color suppression on the white balance adjusted image signal based on the color suppression rate, wherein the chroma composition ratio determination unit sets the chroma composition ratio of a signal indicating the minimum value among the red signal, green signal and blue signal as 1 and sets the chroma composition of signals other than the minimum value as 0.

12. A control method for an image-sensing apparatus adapted to perform color suppression of an image data signal, the method comprising:

an input step of inputting the image data signal;

a white balance step of adjusting the inputted image data signal and outputs white balance adjusted image signal;

a chroma composition ratio determination step of determining a chroma composition ratio ($\alpha:\beta\gamma$) required for color suppression of the white balance adjusted image signal based on a red signal R, a green signal G and a blue signal B contained in the white balance adjusted image signal outputted in said white balance step;

a signal generating step of generating a chroma suppression signal (Ya) of the white balance adjusted image signal based on the chroma composition ratio;

a color suppression rate determining step of determining a color suppression rate based on the chroma suppression signal;

a color difference signal generation step of generating color difference signals from the red signal R, the green signal G and the blue signal B contained in the white balance adjusted image signal by separating from luminance component; and a color suppression step of performing color suppression on the color difference signals indicating chroma component generated by said color difference signal generation unit based on the color suppression rate.

13. A control method for controlling an image-sensing apparatus adapted to process a red signal R, a green signal G and a blue signal B of an image data signal, the method comprising:

an image-sensing step of image-sensing the image data signal by an image-sensing element;

a white balance step of adjusting the inputted image data signal and outputs white balance adjusted image signal;

a chroma composition ratio determination step of determining a chroma composition ratio ($\alpha:\beta\gamma$) required for color suppression of the white balance adjusted image signal based on a red signal R, a green signal G and a blue signal B contained in the white balance adjusted image signal;

a signal generating step of generating a chroma suppression signal (Ya) of the white balance adjusted image signal based on the chroma composition ratio;

a color suppression rate determining step of determining a color suppression rate based on the chroma suppression signal; and a color suppression step of performing color suppression on the white balance adjusted image signal based on the color suppression rate, wherein the chroma composition ratio determination step sets the chroma composition ratio of a signal indicating the minimum value among the red signal, green signal and blue signal as 1 and sets the chroma composition of signals other than the minimum value as 0.

\* \* \* \* \*

UNITED STATES PATENT AND TRADEMARK OFFICE
CERTIFICATE OF CORRECTION

PATENT NO. : 7,113,207 B2  Page 1 of 1
APPLICATION NO. : 10/216999
DATED : September 26, 2006
INVENTOR(S) : Fukui et al.

It is certified that error appears in the above-identified patent and that said Letters Patent is hereby corrected as shown below:

Column 15, Line 11, change "α:βγ" to --α:β:γ--;

Column 16, Line 10, change "α:βγ" to --α:β:γ--.

Signed and Sealed this

Twentieth Day of February, 2007

JON W. DUDAS
*Director of the United States Patent and Trademark Office*